United States Patent [19]
Breil et al.

[11] Patent Number: 5,737,812
[45] Date of Patent: Apr. 14, 1998

[54] TRANSPORT DEVICE FOR A MOVING MATERIAL WEB

[75] Inventors: Jürgen Breil, Grabenstätt; Manfred Steffl, Grassau, both of Germany

[73] Assignee: Bruckner Maschinenbau GmbH, Siegsdorf, Germany

[21] Appl. No.: 737,822

[22] PCT Filed: Mar. 14, 1996

[86] PCT No.: PCT/EP96/01114

§ 371 Date: Nov. 20, 1996

§ 102(e) Date: Nov. 20, 1996

[87] PCT Pub. No.: WO96/29191

PCT Pub. Date: Sep. 26, 1996

[30] Foreign Application Priority Data

Mar. 21, 1995 [DE] Germany ............. 195 10 141.3

[51] Int. Cl.$^6$ ............................................. D06C 3/04
[52] U.S. Cl. ............................ 26/89; 26/72; 26/93
[58] Field of Search ............................ 26/72, 73, 93, 26/89, 71, 94, 96; 264/288.4, 290.2, 291

[56] References Cited

U.S. PATENT DOCUMENTS

| | | | |
|---|---|---|---|
| 3,457,608 | 7/1969 | Gageur | 26/93 |
| 3,748,704 | 7/1973 | Schmidt et al. | 26/93 |
| 3,890,421 | 6/1975 | Habozit | 26/73 |
| 4,706,348 | 11/1987 | Gresens | 26/93 |
| 4,879,493 | 11/1989 | Suzuki et al. | |
| 4,890,365 | 1/1990 | Langer | 26/73 |
| 5,072,493 | 12/1991 | Hommes et al. | |
| 5,081,750 | 1/1992 | Molz | 26/93 |
| 5,084,949 | 2/1992 | Rutz et al. | 26/93 |

FOREIGN PATENT DOCUMENTS

| | | |
|---|---|---|
| 2147876 | 8/1971 | France . |
| 2317076 | 7/1975 | France . |
| 3333938 | 9/1983 | Germany . |
| 3339150 | 10/1983 | Germany . |
| 3741582 | 12/1987 | Germany . |
| 3928454 | 8/1989 | Germany . |
| 4006440 | 3/1990 | Germany . |
| 1442113 | 6/1973 | United Kingdom . |

OTHER PUBLICATIONS

Database WPI Section Ch, Derwent Publications Ltd., London, GB; Class A32, AN 73-72307U XP002005726 & JP,B,48 038 779 (Japan Steel Work Ltd).

*Primary Examiner*—Amy B. Vanatta
*Attorney, Agent, or Firm*—Nixon & Vanderhye

[57] ABSTRACT

An improved transport device for a moving material web, in particular a stretching system for plastic film webs, comprises tenter elements (1) which can be moved along a guide rail system (3) on both sides of the material web (11). In this case, on both sides of the moving material web (11), a linear motor (5', 5") and a guide rail (3', 3") are provided, preferably in each case at least above and below the moving material web (11). The sequence of the guide rails located above, in relation to the linear motor, is opposite with respect to the moving material web, to the linear motors located below and the guide rail located below. In an alternative preferred embodiment, a maximum vertical and a maximum horizontal distance (a, b) are provided between a point of intersection (S) at the clamping point of the material web (11), which distance is selected such that the tenter mounting is stressed as little as possible.

14 Claims, 6 Drawing Sheets

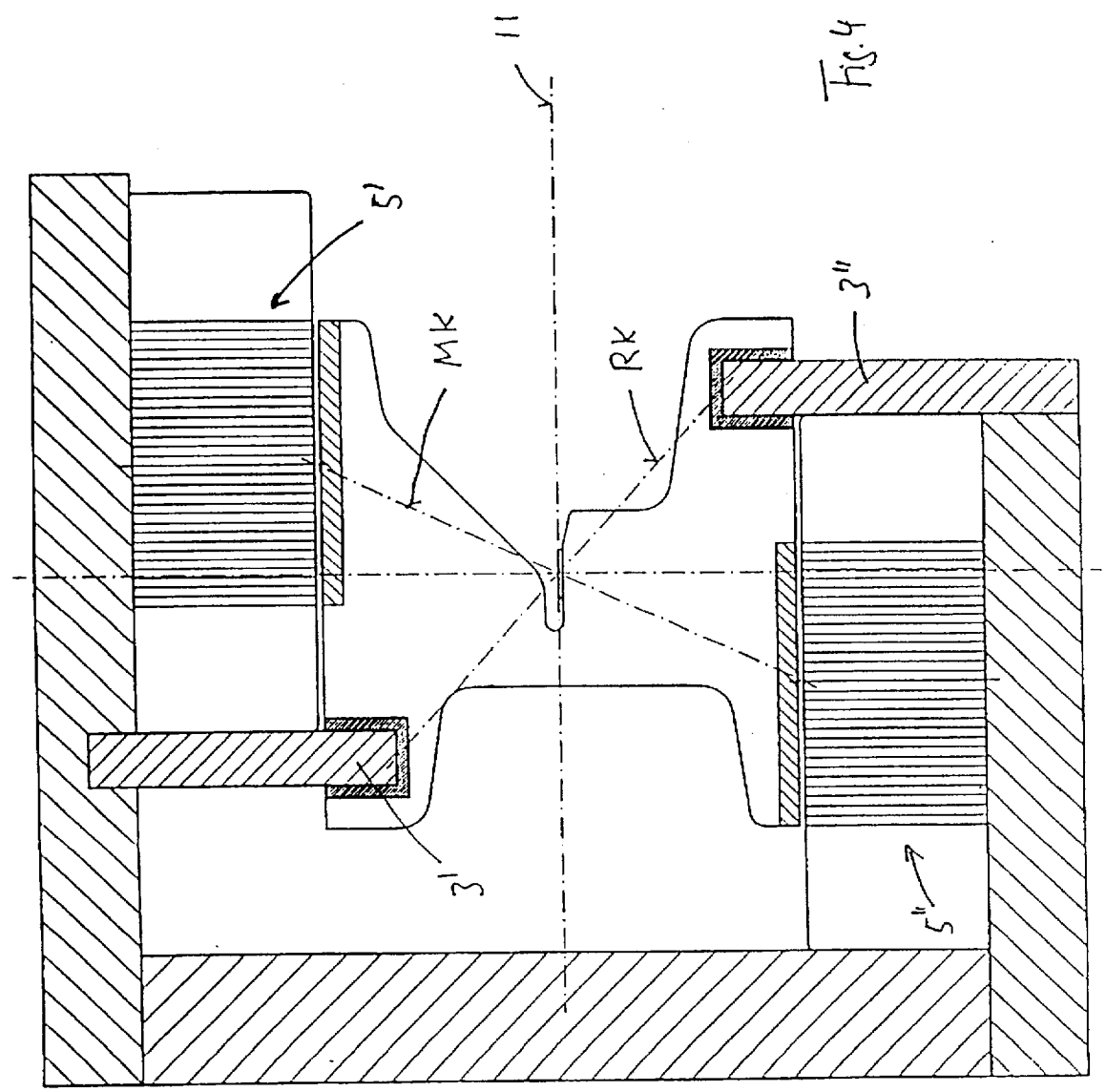

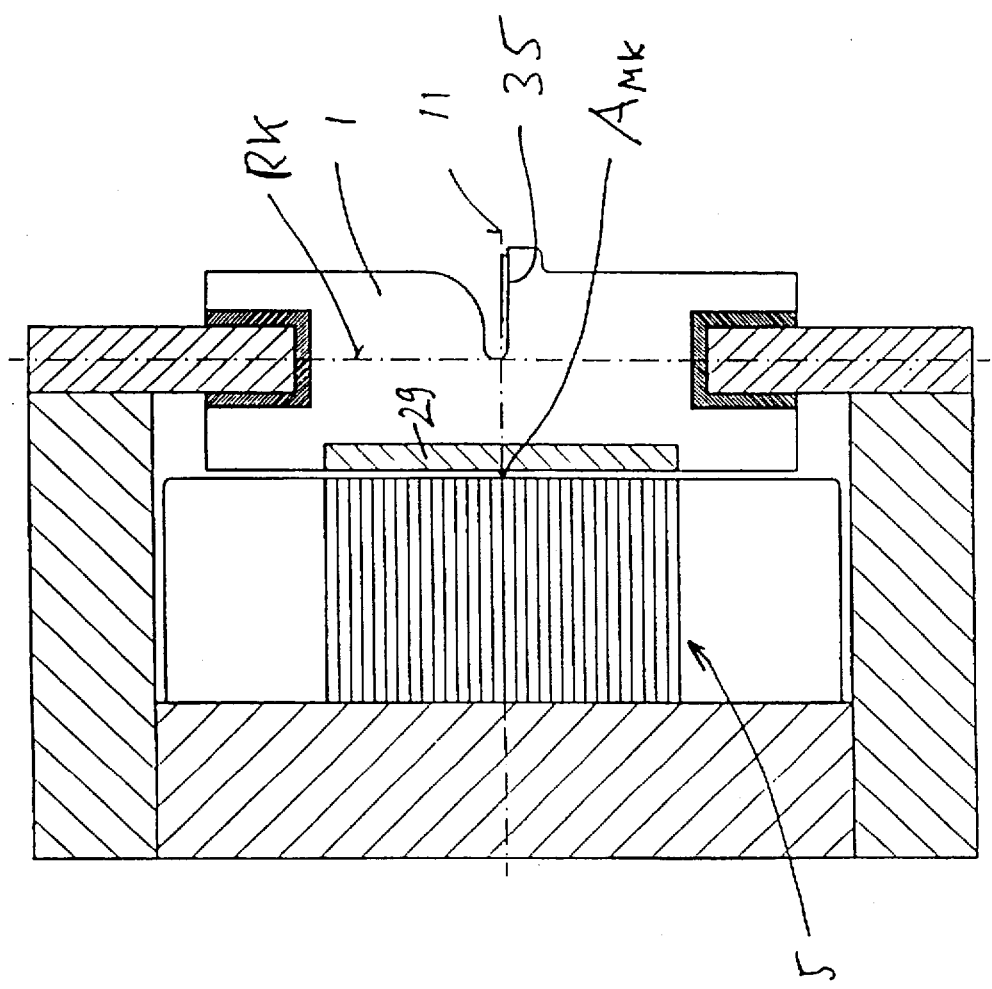

TRANSPORT DEVICE FOR A MOVING MATERIAL WEB

The invention relates to a transport device for material webs, in particular a stretching system for plastic film webs, in accordance with the precharacterizing clause of claim 1, 3 or 4.

Devices for stretching a moving material web are employed in particular in the production of plastic films.

In the production of plastic films, both transverse stretching systems, longitudinal stretching systems and also simultaneous stretching systems are known, in which the material web, that is to say the plastic film web, is simultaneously subjected to a longitudinal and transverse stretching.

For this purpose, so-called tenters or tenter carriages are used, which are moved along a guide device, generally a guide rail.

A device for the simultaneous biaxial stretching of a moving material web, in particular a plastic web, has been disclosed, for example, by DE 37 41 582 C2. In this case, a multiplicity of tenters or tenter carriages run around along guide rails on both sides of the material web to be treated, and are connected to one another by means of chain scissor-jacks. By means of the specific separate guidance of the chain jacks, in this case the spacing of the individual tenter carriages can be deliberately increased in the stretching zone, so that the longitudinal and transverse stretch ratio can be adjusted thereby. As is known, there are provided on the tenter carriages clamping devices by means of which the edge of the material web to be treated can be gripped and moved on.

A device for the transverse stretching and fixing of film webs has been disclosed, for example, by DE 40 06 440 C2, in which device the individual chain carriages or tenter carriages are moved on by means of a circulating transport chain, the spacing between the individual tenter carriages remaining essentially unchanged.

Even though it is known from DE 33 33 938 to support the tenter element, for example, via three sliding guides which are stationary and located offset with respect to one another, in practice corresponding transport devices with tenter carriages have become widespread, said carriages being guided via a plurality of rollers which are seated at intervals in the longitudinal direction of the guide web on the tenter carriage and support the tenter carriage in the vertical and horizontal direction.

In order to increase the production capacity, web speeds are also continuously increasing. Web speeds of more than 300 m/min are not infrequent. In particular also in relation to the non-negligible mass of the individual tenter carriages, the loading on the rollers and bearings and on the guide rails is also naturally increasing.

Thus, for example for simultaneous stretching systems according to U.S. Pat. No. 5,072,493, inter alia also to increase the web speeds and to minimize the susceptibility to faults, it is proposed to drive a tenter carriage, which can likewise be moved along a guide rail by means of running rollers, by means of a linear motor. This opens up the possibility that in principle the tenter carriages can be driven and accelerated individually and that, for example, differing from the simultaneous stretching system according to DE 37 41 582 C2, the chain jacks connecting the individual tenter carriages can be dispensed with.

Nevertheless, with the increasing transport and web speeds of the advancing web and hence of the tenter carriages, the forces arising on the tenter carriages are increasing in such a way that, on account of the loadings occurring, and in particular also the bearing loadings, the lifetime of the overall transport system is restricted and repairs are frequently necessary because of failures.

It is therefore an object of the present invention to provide an improved transport device for material webs, in particular a stretching system for stretching plastic film webs, which, by contrast, is less susceptible to faults and makes longer operating times possible.

It must be considered entirely surprising that a distinct improvement over the prior art is possible, in the sense of the invention, using comparatively simple means.

Specifically, by means of the device according to the invention, by contrast with conventional solutions the bearing forces on the tenter element in relation to the guide rail are distinctly minimized.

Furthermore, the inclination of the tenter carriage because of the forces acting on it is minimized, with the result that the tendency of the tenter carriage to tilt, in conjunction with a risk of self-locking of the bearing is not only reduced but avoided.

Because of these improved properties, systems having distinctly higher transport speeds by comparison with conventional devices may be realized. This is fundamentally true both for longitudinal stretching systems and for transverse stretching systems, but in particular also for rapid simultaneous stretching systems.

The advantages according to the invention may, proceeding from the principle, already be realized to a certain extent if, in the case of using a so-called dual rail, that is to say two guide rails which are generally arranged one above another and therefore transversely to the material web, these and the linear motor comprising an upper and lower linear motor drive are arranged such that the positions of the upper guide rail and of the upper linear drive are arranged in reverse sequence in the direction of the material web to those of the linear motor located below and the lower guide rail. This is because by this means a tenter construction is already made possible in which the lines of action can be drawn such that the lines of action connecting the points of engagement of the forces intersect in the central region between the two linear motor drives and the two guide rails, and here the tenter element and, above all, the clamping point on the tenter table can lie correspondingly close to this point of intersection or center.

The lines of action are the connecting lines between the engagement points of the forces acting in the longitudinal direction and hence parallel to the guide rail, which lines meet at a common point.

The tilting and hence bearing or frictional forces which are introduced onto the tenter carriage are intended to be kept as low as possible in this case. The bearing forces acting on the tenter carriage are then as low as possible if these forces act symmetrically to the fixed clamping point, that is to say to the clamping or folding-in point, at which the material web is retained clamped on the tenter carriage. In other words, the geometry is selected in such a way that, as a result of the forces applied in principle to the tenter carriage (motor drive forces; forces introduced by the guide rail system, such as in particular frictional forces, etc.) lead to as low an introduction of moments as possible and as a result contribute to a lower stress on the tenter mounting.

Therefore, according to the invention, provision is preferably made for the material web to be retained clamped on the relevant tenter carriage in such a way that the clamping point comes to lie at the center of the forces acting, that is to say at the point of intersection of the lines of action connecting the respective engagement points (engagement vectors) of the forces, or at least as close as possible to this point of intersection.

Use is preferably made of dual rail systems which are arranged at least with one component located opposite in such a way that the tenter element comes to be located in the remaining interspace. By this means, the clamping point can even be placed in the point of intersection of the lines of action. However, the use of a monorail is nevertheless possible, that is to say a single guide rail, preferably between the upper and lower linear motor drives, specific spacing values for the position of the clamping point having to be taken into account here.

Finally, the drive device can also be designed in such a way that a linear motor drive is provided on both sides of the guide rail. In principle, this may also be realized by the guide rail being integrated into the linear motor.

In fact, as a result of the tenter geometry according to the invention, the situation is achieved in which the forces acting on the tenter carriage are largely balanced out, that is to say cancel each other out in their effect as symmetrically as possible, with the result that the introduction of force into the material web (which is produced in the manufacture of plastic films, in particular during longitudinal or simultaneous stretching) is minimized.

As a result, therefore, the bearing forces which occur as a whole are distinctly minimized and, above all, the said tendency of the tenter carriage to tilt, with the risk of self-locking of the bearing, is avoided or completely excluded.

As a result, even without additional measures by contrast with conventional solutions, distinctly higher web speeds can be used, in particular even in the case of simultaneous stretching systems.

Within the context of the invention, an embodiment is also possible in which a drive device which is provided on opposite sides of the tenter element and engages on the tenter element, in particular in the form of the said linear motor drive, but only a single drive device in the form of a [lacuna] comes to be located at the side and preferably on that side of the guide rail or guide rail sections opposite the clamped material web edge.

Further advantages, details and features of the invention emerge below from the exemplary embodiment shown using drawings, in which in detail:

FIG. 4 shows a cross-sectional representation modified from FIG. 1;

FIG. 6 shows a further exemplary embodiment modified from FIG. 1; and

Figure 1:
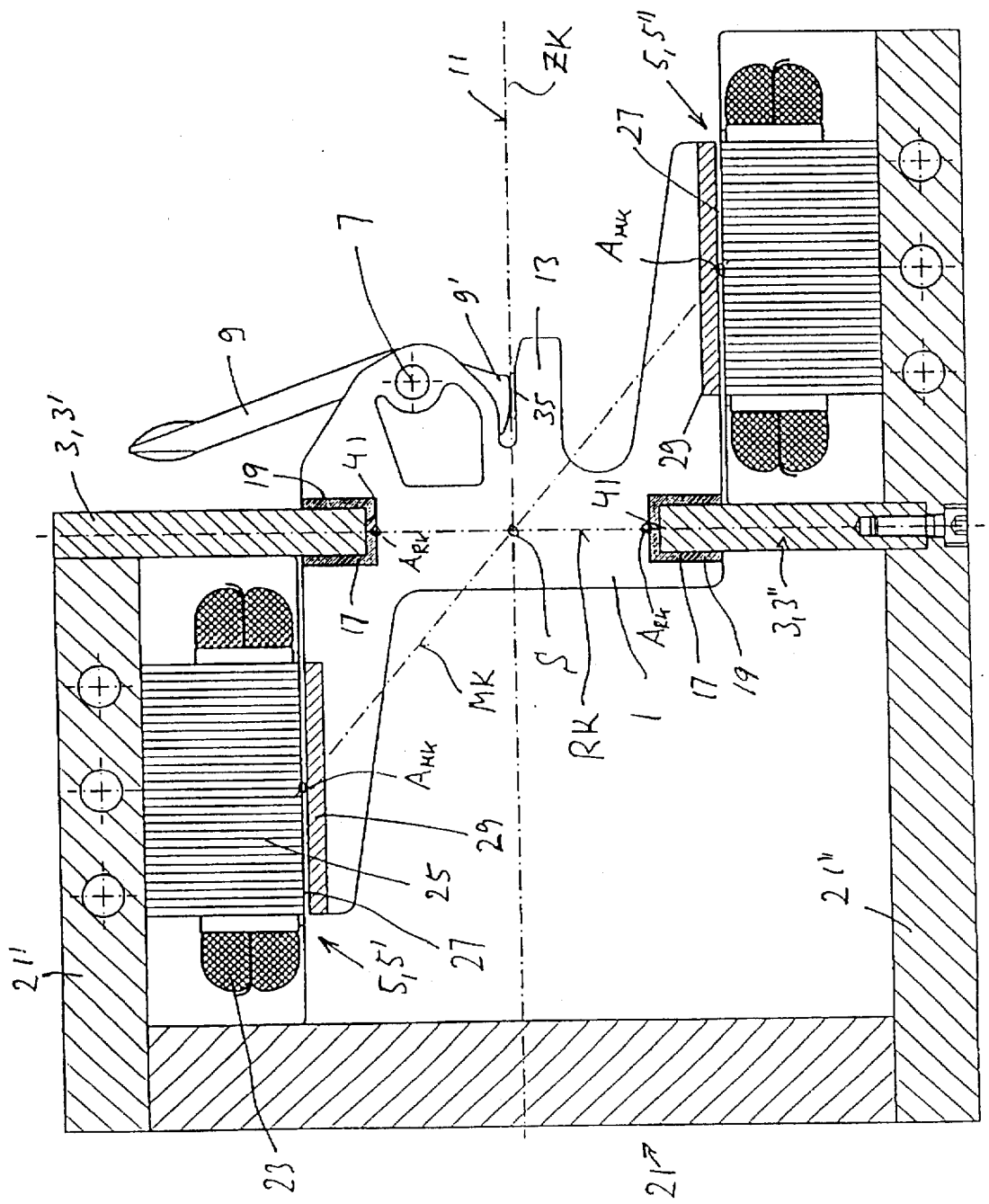
FIG. 1 shows a schematic cross-sectional representation at right angles to the longitudinal direction of a guide rail, and a tenter element which can be moved longitudinally thereon.

Shown in FIG. 1, in schematic front view, is a tenter element 1 which can be moved along a guide rail system 3—that is to say at right angles to the drawing plane—by means of a linear motor drive 5.

The tenter element 1 comprises a clamping lever or tenter lever 9 which can be pivoted about a pivot axis 7.

Along the chain-dotted material web plane 11, a material web, in the case of plastic film production a plastic film web to be stretched, is retained clamped at the edge between the lower clamping point 9' of the tenter lever 9 and the so-called tenter table 13 during the onward movement of the material web and in particular during the stretching process. As a result, tensile forces are introduced onto the tenter element 1 via the material web.

The guide rail system 3 comprises an upper guide rail 3' and a lower guide rail 3" which, in the exemplary embodiment shown in accordance with FIG. 1, are located one above another in a common guide rail plane which, in the exemplary embodiment shown, lie at right angles to the material web plane 11 and thus at right angles to the material web tensile forces ZK.

In the relevant tenter element 1 there are sliding elements 17, which are of U-shaped cross section and are retained and fastened in the tenter element 1 by a suitable means such as using a bonding or vulcanizing technique.

Figure 2:
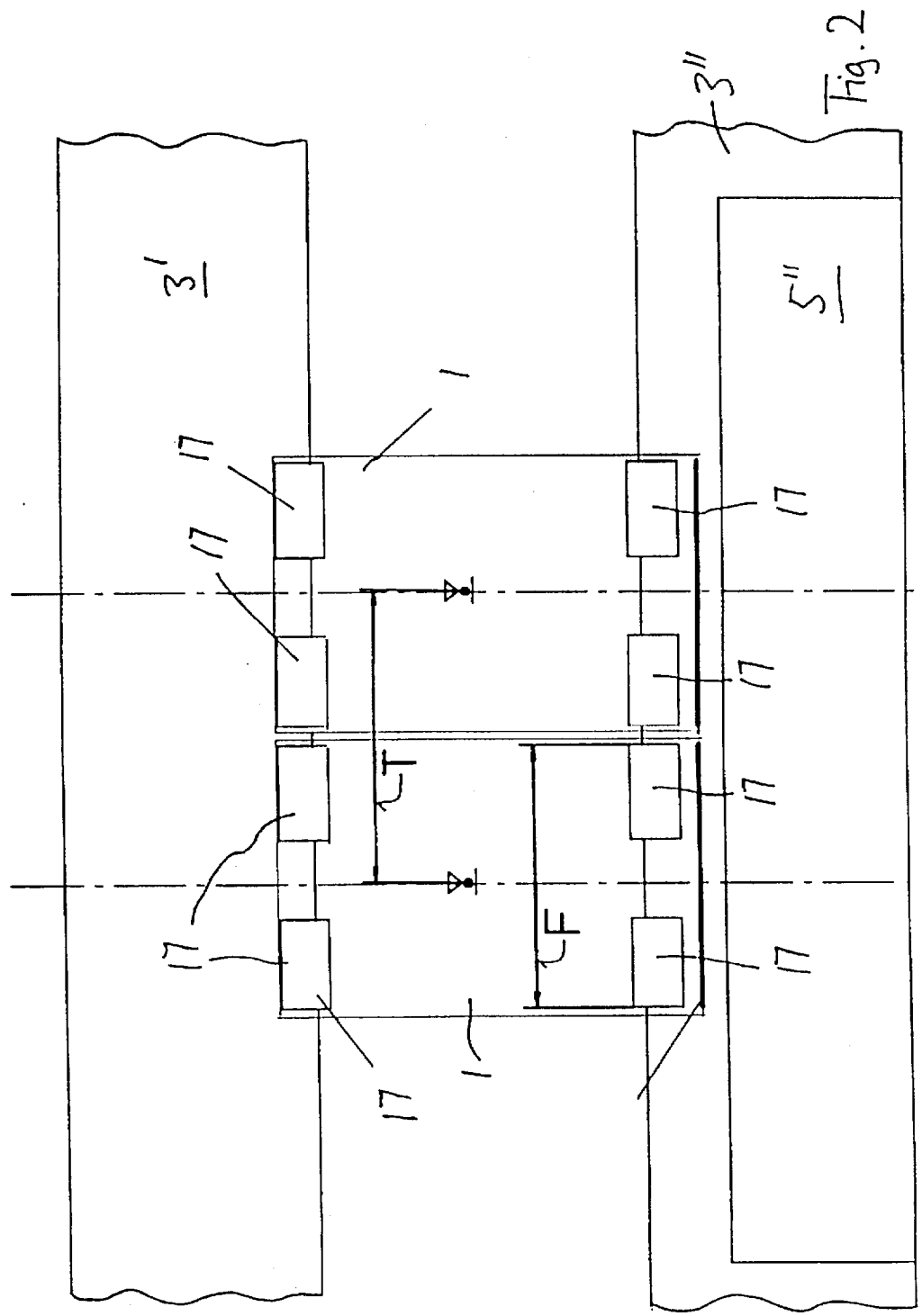
FIG. 2 shows a schematic side view of two tenter elements which are adjacent to one another and can be moved on along the guide rail.

The sliding elements 17 are generally dimensioned to be shorter in relation to that length of the tenter element 1 running parallel to the guide rail 3, so that provision can be made on the respective upper and lower guide rail section 3' and 3" of, for example, at least two sliding elements 17 seated at a distance from each other (angular sliding element sections located opposite each other can also be designed in the relevant groove-shaped guide cutouts 19 in the tenter element 1 and able to be moved with the latter). Shown in FIG. 2 is a schematic side view with two adjacently arranged tenter elements 1 which can be moved between an upper rail 3' and a lower rail 3". In the case of the side representation from the side of the material web 11, a section of linear motor 5" positioned in front of the lower guide rail 3" is illustrated. The linear motor 5' located at the top lies behind the upper guide rail 3'. In this case, the upper and lower sliding elements 17 are illustrated schematically, above which the tenter carriages are supported in a sliding fashion on the guide rail 3' or 3".

The two guide rails 3' and 3" are part of a guide rail carrier 21, which is C-shaped in cross section, a linear drive 5' having a laminated core 25 which is penetrated by a multiplicity of wire windings to form a winding head 23 being provided on the upper guide rail carrier section 21', and a correspondingly constructed second linear motor 5" being provided on the lower guide rail carrier section 21".

The magnets, that is to say permanent magnets 29, which are necessary for the linear motor drive are in each case provided on the adjacent sections on the tenter element 1, forming an air gap 27 which is of small dimension.

As can be seen from the cross-sectional representation according to FIG. 1, the upper linear motor 5' is arranged on that side of the upper guide section 3' located opposite the material web, and the linear motor 5" located below is arranged on that side of the lower guide rail section 3" which is located facing the material web.

In the case of this geometry of the guide rail carrier 21, including the drive device in the form of the linear motors 5', 5", the tenter construction is now selected such that the clamping point 35, at which the edge of the material web comes to lie between the lower clamping point 9' of the tenter lever 9 and the tenter table 13, as close as possible to a point of intersection S, formed by the lines of action or connecting lines of the engagement points of the acting forces. In the present case, this is the line of action or connecting line MK, which is formed by the motor forces, that is to say the forward drive or braking forces produced and caused in particular by the linear motor drive, and the line of action or connecting line RK which is formed by the frictional forces. In this case, the engagement points of the line of action MK are selected to be located approximately at the center of the linear motor drive, between the linear motor 5', 5" representing the primary part and the center of the adjacent permanent magnet 29. The engagement points of the guide system 3 coincide with the mutually facing end longitudinal sides 41 of the guide rails 3', 3".

It was described above that the lines of action represent the connecting lines between the respective engagement points of the forces acting on the tenter carriage. In actual fact this represents a certain simplification in two respects. This is because in the first place there is not one "engagement point", but engagement vectors running parallel to the advancing movement of the tenter, that is to say parallel to the linear motor and to the guide rail, e.g. directed variables which transmit corresponding tilting moments and torques to the tenter element and hence contribute to increasing the bearing and frictional moments.

Furthermore, the advance and drive forces are introduced onto the tenter carriage by the linear motors not only along a force vector standing at right angles to the drawing plane in FIG. 1, but over the entire width of the linear motor and of the permanent magnet 29 which is opposite the latter and is provided on the tenter element 1. Therefore, in the case of a differentiated method of consideration, a multiplicity of lines of action would have to be drawn in, which in each case proceed from engagement points located offset in the region between linear motor and permanent magnet and end at the corresponding engagement points on the opposite linear motor, all these engagement lines having to run through a common point of intersection S in which the forces are "balanced out". The "engagement point" $A_{MK}$ drawn in FIG. 1 represents to this extent only in a simplified form a "resulting engagement vector", which is at right angles to the drawing plane. In the individual case, said vector need not absolutely necessarily lie in the center of the linear motor (or in the center of the permanent magnet), but can also lie at least slightly eccentrically offset thereto. The actual position of the resulting force engagement vector $A_{MK}$ results from considering the integral sum.

The same method of consideration also applies in principle for the guide rail system, that is to say the frictional forces which, in a simplified formation of the sum, are indicated in FIG. 1 as the resulting engagement vector $A_{RK}$ at right angles to the drawing plane.

The lines of action MK and RK drawn in FIG. 1 therefore represent the lines of action, resulting in simplified form, of the averaged engagement vectors which engage on the tenter element 1 at right angles to the drawing plane in FIG. 1, on the one hand in relation to the linear motors and in relation to the guide rail system.

In the case which is not completely symmetrical, it is also therefore quite possible that the point of intersection S does not come to lie exactly at the center point of the length of the lines of action.

The function and mode of operation will be explained below with reference to the schematic representation according to FIG. 3, which largely corresponds to the exemplary embodiment according to FIG. 1 and differs only in the fact that in the exemplary embodiment according to FIG. 3, which is reproduced in schematic form, the two guide rails 3' and 3" likewise still lie laterally offset in relation to one another.

In this case, the geometry is such that the clamping point 35 is arranged in a location such that the vertical distance a, measured at right angles to the material web plane, is less than or equal to 0.6 times the height H which is formed by the distance, formed at right angles to the material web, between the guide rail sections 3' and 3". Furthermore, the clamping point 35 is arranged such that the horizontal distance b is less than or equal to 0.6 times the guide spacing F of the tenter carriage. In this arrangement, the guide spacing of the tenter carriage is drawn in FIG. 2. It corresponds essentially to the maximum external spacing of the one or more sliding elements 17 which, in certain circumstances, coincide with the length of the tenter element 1 or can at least partly correspond thereto.

In the event that use is made not only of a pure sliding bearing but of a mixed bearing comprising sliding and roller bearing means, in relation to the roller bearing the magnitude of the guide spacing results from the axial distance between a leading and trailing running roller via which the tenter carriage 1 is guided. The axial spacing in this case corresponds to the spacing of the line contact of the running rollers located offset in the longitudinal direction.

As an alternative or in addition to the calculation described above of the horizontal distance b, favorable and optimum force relationships are also achieved if the horizontal distance b, which is thus defined parallel to the material web plane, is less than or equal to the division T of the tenter carriages, that is to say less than or equal to the smallest distance between two tenter tables 13 when the material web is gripped, in the case of a plastic film web before the gripping of the films before the longitudinal or simultaneous stretching. The division T is drawn in FIG. 2.

From the exemplary embodiment according to FIGS. 1 and 3 it can also be seen that the overall arrangement has a 180° symmetry, that is to say that the upper guide rail 3' and the upper linear drive 5' have a 180° symmetry in relation to the lower guide rail 3" and to the linear motor 5" located below, in relation to the point of intersection S. In other words, that is to say that the point of intersection S is located in the center between the guide rails 3', 3", which are spaced apart, and in the center between the linear motor drives 5', 5".

Under certain circumstances, however, a geometry deviating from the 180° rotational symmetry can also be selected here, in which geometry the point of intersection does not lie ideally in the center of the line of action MK, RK, but deviates therefrom, for example by less than 50%, preferably less than 40%, 30%, 20% and in particular 10% of the respective overall length of the line of action MK or RK.

Figure 3:
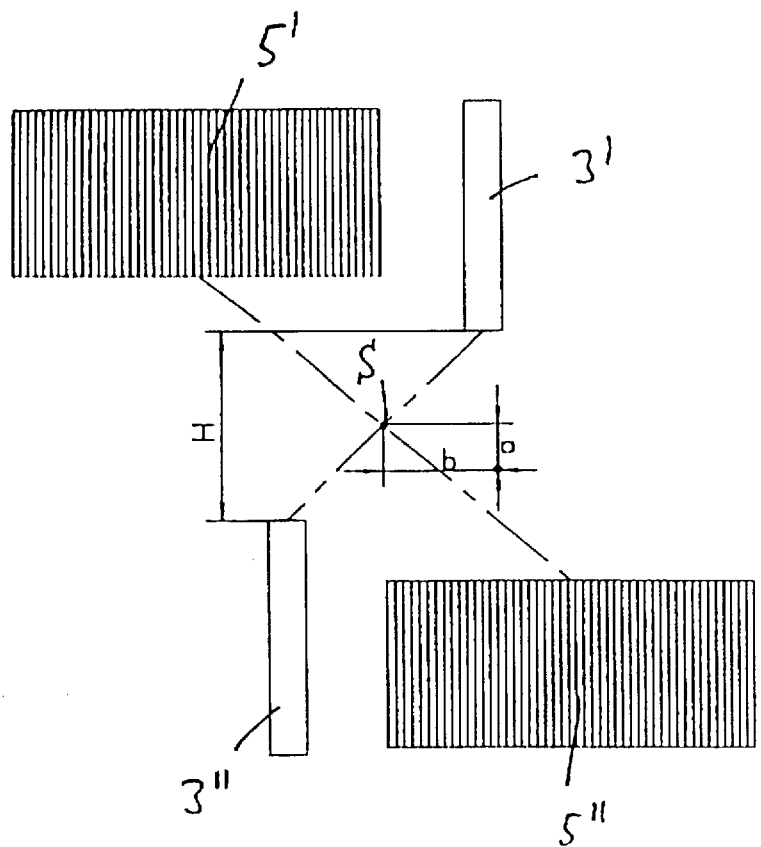
FIG. 3 shows a schematic representation, comparable with the exemplary embodiment according to FIG. 1, to explain the force relationships occurring and the geometry of the tenter carriage as well as of the drive and guide rail system.

Shown in FIG. 4 is an arrangement essentially corresponding to the schematic representation according to FIG. 3, in which the upper and lower guide rails 3', 3" lie at different distances from the material web. The arrangement here is such that the line of action MK and the line of action RK intersect in such a way that their point of intersection S comes to lie exactly at the clamping point 35 on the tenter table 13.

Figure 5:
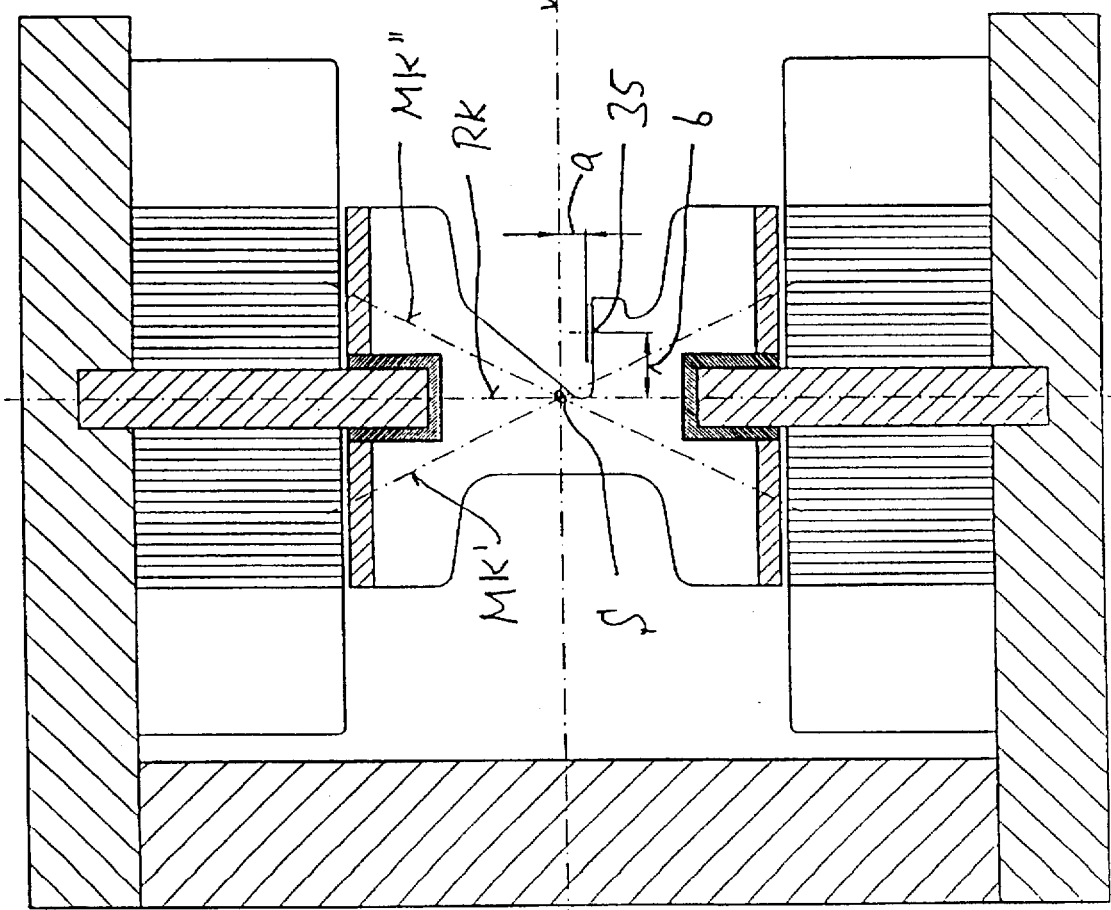
FIG. 5 shows a further exemplary embodiment, modified from FIG. 1, in a schematic cross section transverse to the longitudinal direction of the guide rail.

FIG. 5 shows an exemplary embodiment in which the upper and lower guide rail 3', 3" are essentially centrally integrated in the linear motor 5', 5". If the upper and lower linear drive 5', 5" are considered as the respective unit for linear drive, then the line of action of the drive forces MK would come to lie congruently with the line of action of the guide system RK, namely at right angles to the material web plane 11. However, the upper and lower linear motor can also be interpreted as a dual linear motor drive, so that here in each case alternately two motor characteristic lines MK' and MK" can be formed which intersect at the point of intersection S (at the height of the material web plane 11) with the guide rails 3', 3" which in this exemplary embodiment are located once more in a common plane running at right angles to the material web 11, that is to say intersect with the line of action RK of the guide rail system 3. The horizontal distance b between point of intersection S and clamping point 35 or, respectively, the vertical distance a are selected as explained above.

Using FIG. 6, a modified exemplary embodiment is shown in which only one linear motor 5 is provided in the vertical direction, and is arranged located symmetrically to the plane of the material web 11. The tenter element 1 in this case has a vertically aligned permanent magnet 29. The guide rails 3' and 3" are in turn located one above the other in a common plane at right angles to the plane of the material web 11.

The force engagement point of the motor forces is here drawn in the center between the linear motor 5 and the permanent magnet 29, and is designated by $A_{MK}$ in FIG. 6. Since a second linear motor for driving the tenter element shown in FIG. 6 is missing, the optimum geometry should be selected here such that the vertical distance e from the center point of the line of action of the guide system RK to the clamping point 35 is less than or equal to 0.6 times the height H (namely of the vertical distance between the guide rails), and the horizontal distance b between the clamping point 35 on the tenter table both to the force engagement point $A_{MK}$ and to the guide rail system line of action RK corresponds to less than or equal to 0.6 times the guide spacing F or else 0.4 times the division T between two tenter tables (when the film is gripped before the stretching).

Finally, for reasons of completeness, it should be noted that the two guide rails, and in certain circumstances also the two linear motors, can be arranged in the same sequence located transversely to the material web, that the two lines of action RK and MK do not intersect or at least do not intersect in the region between the guide rails or between the linear motors. In this case, the desired advantages can be realized at least when the clamping point 35 is placed so closely to the two lines of action that the distance between the clamping point and the line of action RK and also the distance from the clamping point to the line of action MK corresponds once more to less than or equal to 0.6 times the guide spacing F or at least to 0.4 times the division T between two tenter tables. Furthermore, the clamping point 35 should not be further than a maximum of 0.6 times the height H (that is to say of the vertical distance between the guide rails) from the center point of the line of action RK or MK.

Figure 7:
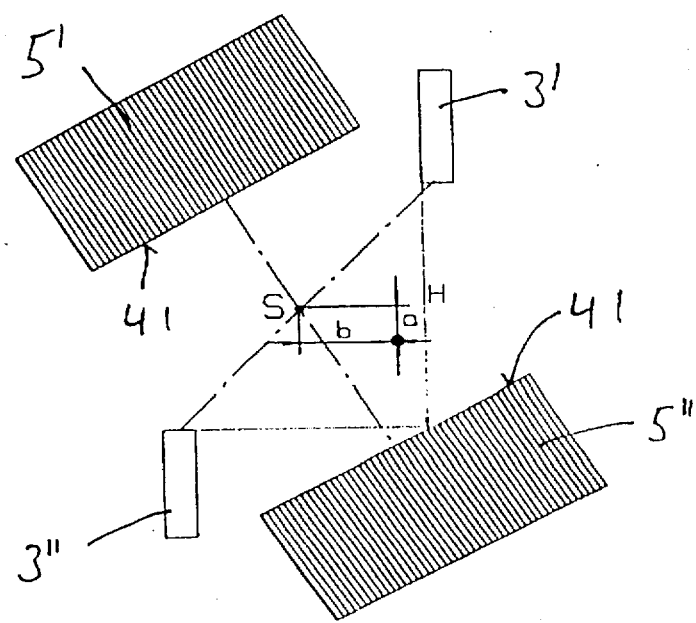
FIG. 7 shows an exemplary embodiment modified from FIG. 3.

In conclusion, reference is further made to FIG. 7, in which a basic representation slightly modified from FIG. 3 is reproduced.

The exemplary embodiment according to FIG. 7 differs from that according to FIG. 3 only in the fact that the upper and lower linear motors are aligned with their active surface not parallel to the plane of the material web 11 but tilted in relation thereto. In the same sense, the tenter carriage would have to be adapted such that the permanent magnet 29 provided in each case on the tenter carriage is aligned at the same angle, with the result that only a normal air gap exists between the appropriately aligned permanent magnet and the lower active surface 41 of the respectively associated linear motor 5' or 5".

The alignment of the linear motors and of the permanent magnets 29, which are not shown in FIG. 7, has been undertaken such that the relevant line of action MK runs at right angles onto the active surface 41 of the linear motor and thus at right angles to the flat extent of the permanent magnet 29 which is seated on the tenter element. By this means, deviating from the other exemplary embodiments (and hence also from FIG. 3) it is ensured that, even in the non-activated state of the linear motor, but also in the operating state with further increased magnetic forces, these tensile forces are introduced onto the tenter element only along the line of action MK (or parallel thereto). In the case of the representation according to FIG. 3, specifically, there still results a tilting moment and torque about the point S, to be specific in the clockwise direction in the exemplary embodiment shown in accordance with FIG. 3. Additional advantages can also be achieved by means of the tilted design in accordance with FIG. 7.

We claim:

1. A transport device for a material web movable in a longitudinal direction, comprising:

first and second linear motors provided on opposite sides of the movable material web;

a guide rail system extending generally longitudinally of and generally parallel to the material web including first and second guide rails;

tenter elements movably carried by said guide rail system for clamping and retaining the movable material web;

said first linear motor and said first guide rail being disposed above a plane containing the movable material web and said second linear motor and said second guide rail being disposed below the plane of the movable material web;

the order of the guide rail and the linear motor disposed above the plane of the movable material web in a direction transverse to the longitudinal direction of movement of the movable material web being opposite to the order of the guide rail and the linear motor disposed below the plane of the movable material web in said transverse direction; and a sliding bearing for at least partly supporting said tenter elements.

2. A device according to claim 1 wherein said first guide rail and said first linear motor above the material web and the second guide rail and second linear motor below the material web are symmetrical with one another about an axis generally parallel to the direction of longitudinal movement of the material web.

3. A device according to claim 1 wherein each tenter element has a clamping point for clamping the movable web material, and a vertical distance between said clamping point perpendicular to the plane of the web material and the intersection of a first line of action defined by a straight line connecting motor forces acting on said tenter element and a second line of action defined by a straight line connecting forces of said guide rail system acting on said tenter element being less than or equal to 0.4 times a vertical distance between said two guide rails.

4. A device according to claim 1 wherein each tenter element has a clamping point for clamping the movable web material, a horizontal distance between said clamping point and a point of intersection formed by an intersection of a first line of action and a second line of action, said first line of action being defined by a straight line connecting motor forces of said first and second linear motors acting on said tenter elements and said second line of action being defined by a straight line connecting forces of said guide rails acting on said tenter elements is less than or equal to a longitudinal dimension between a pair of sliding bearings carried on each said tenter element engageable with the guide rails.

5. A device according to claim 1 wherein a horizontal distance from a point of intersection formed by an intersection of a first line of action defined by a straight line connecting motor forces acting on the tenter elements and a second line of action defined by a straight line connecting forces of said guide rails acting on said tenter element is less than or equal to 0.2 times a longitudinal dimension between clamping points of adjacent tenter elements.

6. A device according to claim 1 wherein a point of intersection formed by an intersection of a first line of action defined by a straight line connecting motor forces acting on the tenter element and a second line of action defined by a straight line connecting forces on said guide rails acting on said tenter elements lies a distance from a center of each said line of action less than 40% of the overall length of said line of action.

7. A device according to claim 6 wherein said point of intersection of said two lines of action lies at the center of the lines of action.

8. A device according to claim 1 wherein each guide rail is integrated with an associated linear motor.

9. A device according to claim 1 wherein said linear motors and permanent magnets carried by said tenter elements are aligned relative to one another such that only tensile forces are introduced by said linear motors onto said tenter elements.

10. A device according to claim 9 wherein said linear motors and said permanent magnets are inclined on each tenter element to the plane of the moving material web such that only tensile forces act on the tenter elements along a line of action defined by a straight line connecting motor forces acting on the tenter elements.

11. A transport device for a material web movable in a longitudinal direction, comprising:

first and second linear motors provided on opposite sides of a movable material web;

a guide rail system extending generally longitudinally of and generally parallel to the material web including first and second guide rails;

tenter elements movably carried by said guide rail system for clamping and retaining the movable material web, each said tenter elements including longitudinally spaced sliding elements for engaging said guide rails, respectively;

a sliding bearing for at least partly supporting each said tenter element, each said tenter element having a clamping point for retaining and anchoring the material web, said clamping point having maximum vertical and horizontal distances from a point of intersection such that for the vertical distance a $$0 \leq a \leq 0.6 \times H$$

and, for the horizontal distance b $$0 \leq b \leq 0.6 \times F$$

or $$0 \leq b \leq 0.4 \times T$$

where the point of intersection is formed by an intersection of a first line of action and a second line of action, said first line of action being defined by a straight line connecting motor forces of said first and second linear motors acting on said tenter elements and said second line of action being defined by a straight line connecting forces of said guide rails acting on said tenter elements, H is a vertical distance between said two guide rails, F is a longitudinal dimension between said sliding elements of each tenter element along the guide rail system and T is a longitudinal dimension between two adjacent tenter elements.

12. A transport device according to claim 11 wherein said first linear motor and said first guide rail are disposed above a plane containing the movable material web and said second linear motor and said second guide rail are disposed below the plane of the movable material web;

the order of the guide rail and the linear motor disposed above the plane of the movable material web in a direction transverse to the longitudinal direction of movement of the movable material web being opposite the order of the guide rail and the linear drive disposed below the plane of the movable material web in said transverse direction; and said sliding elements comprising sliding bearings for at least partly supporting said tenter elements.

13. A transport device for a moving material web lying substantially in a horizontal plane, comprising:

a linear motor system provided on both sides of the material web and including one linear motor;

a guide rail system extending generally parallel to the material web including first and second guide rails;

tenter elements movably carried by said guide rail system for clamping and retaining the material web;

said first guide rail being disposed above the plane containing the moving material web, said second guide rail being disposed below the plane containing the moving material web;

said one linear motor being aligned substantially in a vertical direction and lying transverse to the plane of the material web; and a permanent magnet carried by the tenter element adjacent a line of action defined by a straight line extending between said first and second guide rails and lying in a vertical plane.

14. A device according to claim 13 wherein each said tenter element has a clamping point for retaining and anchoring the material web and longitudinally spaced sliding elements for engaging said guide rails, respectively, a vertical distance between said clamping point carried by the tenter element and the moving material web relative to the intersection of a first line of action defined by a straight line connecting between said guide rails and a force engagement point of the linear motor being less than or equal to 0.6 times the vertical distance between said guide rails, and a horizontal distance from said clamping point both to a center of the first line of action and to the force engagement point of the linear motor is less than or equal to 0.6 times the longitudinal dimension of the support of a tenter element or less than or equal to 0.4 times the spacing dimension between two tenter elements.

* * * * *